United States Patent [19]

Gerdes et al.

[11] Patent Number: 5,327,237
[45] Date of Patent: Jul. 5, 1994

[54] TRANSMITTING DATA WITH VIDEO

[75] Inventors: Richard C. Gerdes, Scottsdale; Charles Jungo, Gilbert; Gerald Montgomery, Mesa, all of Ariz.

[73] Assignee: WavePhore, Inc., Tempe, Ariz.

[21] Appl. No.: 715,920

[22] Filed: Jun. 14, 1991

[51] Int. Cl.$^5$ .............................................. H04N 7/08
[52] U.S. Cl. .................................... 348/476; 348/488
[58] Field of Search ................... 358/141, 142, 12, 15

[56] References Cited

U.S. PATENT DOCUMENTS

| | | | |
|---|---|---|---|
| 2,838,597 | 6/1958 | DeVrijer | 358/15 |
| 3,529,081 | 9/1970 | Rider . | |
| 3,700,793 | 10/1972 | Borsuk et al. | 178/6.8 |
| 3,927,250 | 12/1975 | Pullen et al. . | |
| 4,051,532 | 9/1977 | Hilbert | 358/142 |
| 4,074,199 | 2/1978 | de Jager et al. | 325/50 |
| 4,155,039 | 5/1979 | Lechevin | 325/20 |
| 4,177,405 | 12/1979 | Chapdelaine | 315/159 |
| 4,183,054 | 1/1980 | Patisaul et al. | 358/86 |
| 4,208,630 | 6/1980 | Martinez | 375/7 |
| 4,209,748 | 6/1980 | Weber | 455/47 |
| 4,231,114 | 10/1980 | Dolikian | 455/49 |
| 4,379,947 | 4/1983 | Warner . | |
| 4,424,593 | 1/1984 | Kahn | 455/47 |
| 4,479,226 | 10/1984 | Prabhu et al. | 375/1 |
| 4,513,415 | 4/1985 | Martinez | 370/92 |
| 4,538,174 | 8/1985 | Gargini et al. | 358/86 |
| 4,539,707 | 9/1985 | Jacobs et al. | 455/47 |
| 4,578,815 | 3/1986 | Persinotti | 455/15 |
| 4,591,906 | 5/1986 | Morales-Garza et al. | 358/84 |
| 4,602,279 | 7/1986 | Freeman | 358/86 |
| 4,622,694 | 11/1986 | Weber et al. | 455/47 |
| 4,665,431 | 5/1987 | Cooper | 358/145 |
| 4,745,476 | 5/1988 | Hirashima | 358/145 |
| 4,750,036 | 6/1988 | Martinez | 358/147 |
| 4,750,206 | 6/1988 | Schotz | 381/4 |
| 4,807,031 | 2/1989 | Broughton et al. | 358/142 |
| 4,884,139 | 11/1989 | Pommier | 358/142 |
| 4,958,230 | 9/1990 | Jonnalagadda et al. | 358/186 |
| 5,063,446 | 11/1991 | Gibson | 358/142 |
| 5,075,773 | 12/1991 | Pullen et al. . | |
| 5,177,604 | 1/1993 | Martinez | 358/86 |
| 5,200,822 | 4/1993 | Bronfin | 358/142 |

FOREIGN PATENT DOCUMENTS

| | | |
|---|---|---|
| 0263449 | 4/1988 | European Pat. Off. . |
| 0278192 | 8/1988 | European Pat. Off. . |
| 0356903 | 3/1990 | European Pat. Off. . |
| 0365431 | 4/1990 | European Pat. Off. . |
| 0236288 | 10/1987 | Japan ........................... H04N 7/080 |
| 0082090 | 4/1988 | Japan . |

OTHER PUBLICATIONS

King, P., "A Novel TV Add-On Data Communication System", IEEE Transaction, vol. BTR-19, No. 4, pp. 225-230, Nov. 1973.

International Search Report for International Application No. PCT/US 92/03711 filed Apr. 5, 1992.

King, Patrick T., *A Novel Television Add-On Data Communication System*, Journal of the SMPTE, vol. 83, Jan. 1974, pp. 10-13.

Maebara, Akiyoshi and Seizo Tamai, *A Television Facsimile System Employing an Additional Carrier*, New Broadcasting System Research Group, Ser. No. 151, Feb. 1972.

(List continued on next page.)

*Primary Examiner*—Mark R. Powell
*Assistant Examiner*—David E. Harvey
*Attorney, Agent, or Firm*—Spensley Horn Jubas & Lubitz

[57] ABSTRACT

Signal processors for permitting the transparent, simultaneous transmission and reception of a secondary data signal with a video signal in the video band is disclosed. The signal processor in the transmitter rasterizes the data at the horizontal scanning rate and modulates the data with a data carrier at a non-integral multiple of the horizontal scanning rate to obtain frequency interleaving. The data is transmitted during the active video portion of each video line.

39 Claims, 2 Drawing Sheets

OTHER PUBLICATIONS

Christiansen, M.; T. Roste; and J. N. Skålvik; *A Video Scrambler/Descrambler Concept for the PAL Format*, Journal of the Institution of Electronic and Radio Engineers, vol. 57, No. 1, Jan./Feb. 1987, pp. 27–35.

International Search Report for International Application No. PCT/US 92/10406 mailed Oct. 7, 1993.

Gerdes, Richard, "Using Genesys TM HDTV Technologies for Today's Expanded NTSC Service", Presented at 1990 Spring Engineering Conference, Nat'l Assoc. of Broadcasters, Apr. 1, 1990, Atlanta, Ga.

Gerdes, Richard, "Waveform Modulation as Used in Television Applications", Presented at RF Technology Expo 90, Mar. 28, 1990, Anaheim, Calif.

Gerdes, Richard, "Genesys TM HDTV Technologies Expand Existing NTSC Service", Presented at The 24th Annual SMPTE Television Conference, Society of Motion Picture and Television Engineers, Jan. 26, 1990, Lake Buena Vista, Fla.

Gerdes, Richard, "Arizona Based HDTV: The Genesys TM Technologies", Presented at Phoenix Chapter of the Society of Broadcast Engineers, Arizona Broadcasters Association Fall Meeting, Nov. 10, 1989, Phoenix, Az.

Gerdes, Richard, "The Use of Genesys Technology for HDTV", Presented at the 130th SMPTE Technical Conference, Society of Motion Picture and Television Engineers, Inc., Oct. 15–19, 1988, New York, N.Y.

GENESYS: Transmission System for HDTV.

TRANSMITTING DATA WITH VIDEO

BACKGROUND OF THE INVENTION

1. Field of the Invention

This invention relates to transmitting two signals on one communication channel and more particularly transmitting data during the active video portion of a video signal.

2. Description of the Prior Art

Several techniques have been developed to allow the transmission of two signals on the same communications channel. When the communications channel is a specified bandwidth of the spectra, these methods include time division multiplexing, transmitting orthogonally polarized waves, transmitting by two transparent methods, each transparent to the other and frequency interleaving.

In the case of video signals, such as NTSC and PAL signals, several different methods have been used for transmission of additional information in the band. For example, a chrominance (color) signal is transmitted by frequency interleaving the chrominance signal with the luminance (black and white) signal. In particular, for the NTSC standard, the luminance signal and the chrominance signals are frequency interleaved. Of course, the chrominance signals are closely related to the luminance signal and the signals exhibit a high degree of correlation.

There are also intervals where no picture information is being transmitted such as during the vertical and horizontal blanking intervals. In some systems, for example close captioned television for the hearing impaired, the close captioned information is transmitted during the vertical blanking intervals. Of course, the data rate of transmission systems using the blanking period is relatively low, typically about 20,000 bits per second. Although such transmission rates may be suitable for close caption television, this is far too low for the suitable transmission of large volumes of information such as the 1,544 megabits per second for T1 transmission.

Therefore, it is a first object of this invention to permit transmission at a higher data rate than those permitted during the blanking period. It is a second object of this invention to permit transmission at the higher data rate without causing any noticeable interference from the transmitted information to conventional television receivers. It is yet a third object of this invention to achieve such transmission using frequency interleaving.

SUMMARY OF THE INVENTION

These and other objects are achieved through the use of transmission of secondary data during the active primary video interval when pixel information is being transmitted rather than during the horizontal or vertical sync blanking intervals. The transmitted data is preferably frequency interleaved with the chrominance and luminance signal.

The signal processor for use by the transmitter for the novel communications system disclosed herein has five portions. A primary video portion, a timing portion, and a video analyzer portion receive the primary video signal. The timing portion produces a non-integral multiple of the video horizontal scanning frequency for use by a data portion for modulation. In addition, the timing portion produces a composite blanking pulse so that the data portion may rasterize the data to be transmitted.

Another portion, a noise interference reduction portion receives an output from the video portion and provides a noise signal representing noise in the frequency gaps for interleaving of the primary video signal. That noise signal may be subtracted from the video signal to reduce the noise imposed on the modulated data signal when the video and data signals are combined.

A secondary data portion receives the secondary data signal, which may be analog or digital. The secondary data portion rasterizes the data signal and modulates the data signal so that the modulated data signal is frequency interleaved with the primary video signal.

The data portion rasterizes the data signal to include vertical and horizontal blanking periods that will coincide with those blanking periods in the primary video signal when the modulated data signal and the primary video are combined. The rasterized data signal is then modulated by a data carrier so that the modulated data spectral envelope interleaves with the primary video envelope. The resultant combined signal may be received by ordinary video receivers without noticeable interference in the video receiver.

The data signal may be recovered by a receiver incorporating a specialized signal processor. A filter passing those frequencies containing the secondary data supplies a data signal to a phase compensator. The phase compensator eliminates phase shifts induced by the filter. The output of the compensator may then be demodulated, decoded and derasterized. To accomplish the demodulation, a timing circuit should be included that generates the data carrier and generates a system clock including a blanking interval.

DETAILED DESCRIPTION OF THE PREFERRED EMBODIMENTS

Figure 1:
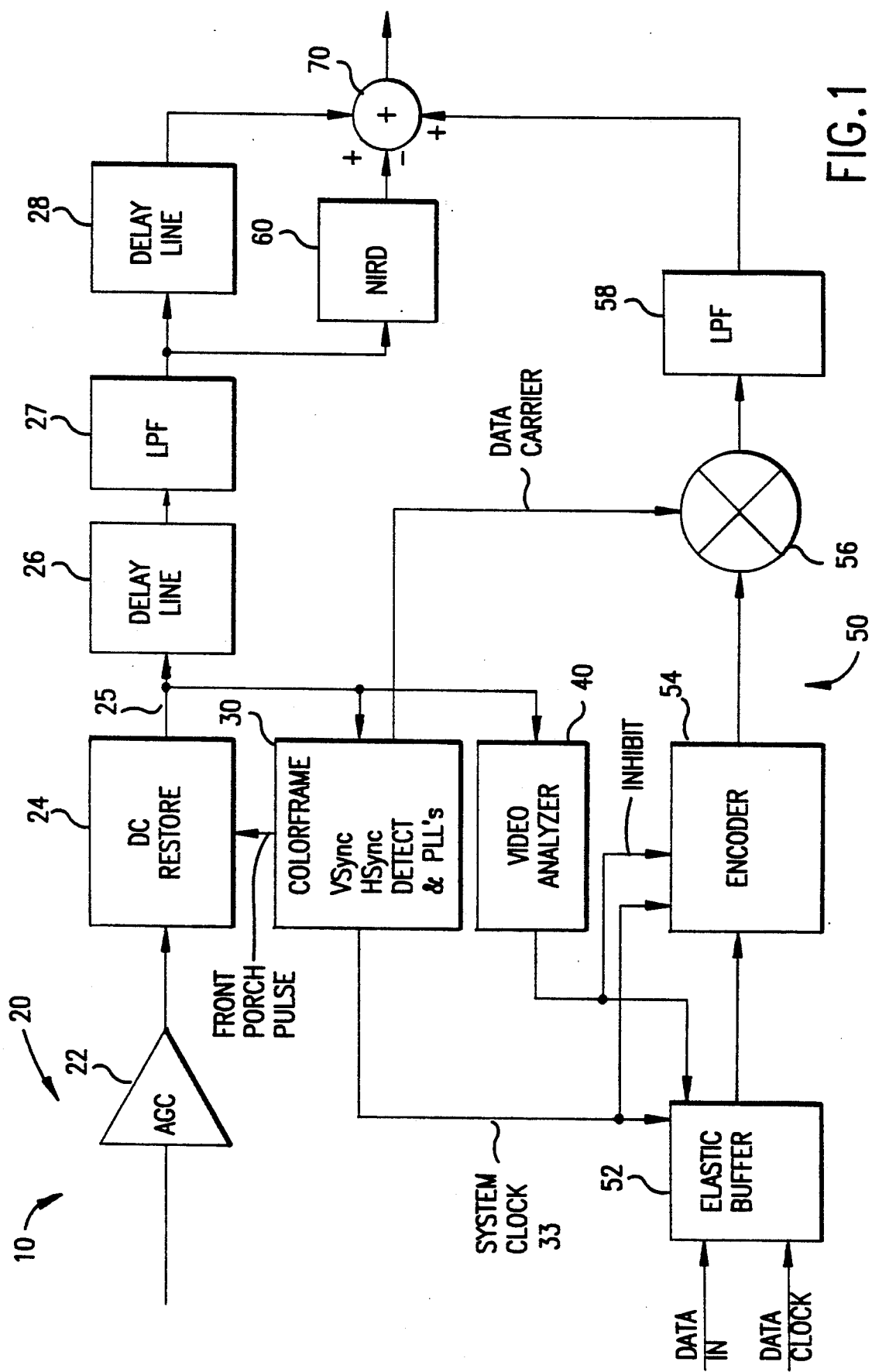
FIG. 1 is a block diagram for a signal processor incorporating an embodiment of the instant invention for use in a transmitter.

FIG. 1 shows an embodiment of the signal processor 10 of the transmitter that may be used for transmitting secondary digital data at the T1 rate of 1.544 Megabits per second through a transmitter with a primary NTSC color video signal. Other embodiments of the invention may be used for transmitting digital data at other data rates or analog data with either an NTSC video signal or another video format signal.

The embodiment 10 comprises five different sections. These sections are a primary video section 20, a timing section 30, a video analyzer section 40, a secondary data modulation section 50 and a noise reduction section 60. An analog summer or adder 70 combines the outputs of the data modulation section 50, the noise reduction section 60 and the primary video section 20. It should be noted, however, that the video section 20, the video analyzer section 40 and the noise reduction section 60 may not be needed depending upon the data rate of the data signal, the quality of the primary video signal and channel noise.

A primary video signal, which in this embodiment may be an NTSC color signal having a horizontal blanking frequency of 15,734.264 hertz and a vertical blanking frequency of 59.940052 hertz is received. The primary video signal comprises luminance and chrominance signals. The NTSC signal also has vertical and horizontal blanking intervals determined by the vertical and horizontal sync pulses and an active video interval between blanking intervals. During the active video intervals, the pixel information for a line of the video picture is transmitted. However, it should be understood that the primary video signal may be any rasterized video signal including video formats commonly used in other countries such as PAL. The primary video signal, which is at baseband, is supplied to the primary video section 20, the timing section 30 and the video analyzer 40.

The peak to peak amplitude of the primary video signal is limited to a predetermined standard by an automatic gain control amplifier 22 and the blanking level of the video signal is set to a predetermined voltage by a DC restore circuit 24. If the primary video signal is an NTSC signal, the function of the DC restore circuit 24 and the automatic gain control amplifier 22 is to supply a signal at an output 25 that complies with the RS 170A standard. If the primary video signal meets the RS 170A standard, the amplifier 22 and the restore circuit 24 may be eliminated.

The output 25 is supplied to a first analog delay line 26. The length of the first analog delay line 26 should at least be equal to the time period required by the video analyzer section 40 to analyze a group of pixels of the primary video signal as will be described below. The output of the delay line 26 is supplied to a low pass filter 27 that reduces noise in the upper band of the video signal. The output of the filter 27 is supplied to a second delay line 28, which provides a delay equal to the delay of the noise interference section 60. The output of the primary video section 20 is supplied to a non-inverting input of the summer 70.

The noise interference section 60 comprises a band pass/comb filter and is preferably the same as the filter 123 in the processor 100 for the receiver. That filter is called a noise interference reduction device. That filter blocks the frequency bands containing the luminance and chrominance signal information. The output of the noise interference section 60 comprises the noise component of the video signal lying in the frequency bands to be occupied by the modulated data. The noise component is then supplied to an inverting input of the adder 70 to remove that noise component present in the primary video section 20 output.

The input data is supplied to a first in first out elastic buffer 52 along with an external clock signal. The data clock controls the rate at which data is stored in the buffer 52. The rate at which data is outputted by the elastic buffer 52 is controlled by two signals, a second, system clock/rasterizing signal 33 provided by the timing section 30 and an inhibit signal supplied by the video analyzer section 40.

The elastic buffer 52 only outputs data at a predetermined rate during the active video portions of the signal as indicated by the system clock signal 33. The system clock 33 is used for rasterizing the data output of the elastic buffer 52 to create blanking intervals.

No data is outputted from the elastic buffer 52 during blanking intervals. The blanking intervals when no data is outputted from the buffer are adjusted sufficiently to synchronize the blanking periods of the output of the video portion 20 and the data portion 50 to the summer 70.

Further, in high speed data transmission such as T1, the elastic buffer 52 is inhibited from outputting data during portions of the video line having sharp transitions as will be explained in more detail below. When the video analyzer section 40 does not inhibit the elastic buffer, the output of the elastic buffer 52 is a rasterized version of the input secondary data; i.e., the data has the same duration blanking intervals and those blanking intervals coincide at the output of the data section 50 with the blanking intervals in the video signal at the output of the video section 20 when they arrive at the adder 70.

The rasterized, secondary data signal from the buffer 52 is supplied to the encoder 54, which also receives the system clock 33 and the inhibit signal from the video analyzer 40. The encoder 54 encodes the data to limit the bandwidth. The encoder 54 may be a NRZ encoder, an FM encoder, an MFM encoder, a Manchester encoder, a 1,7 RLL encoder, a 2,7 RLL encoder or any other encoder that limits the bandwidth of the rasterized data signal output from the elastic buffer 52. In addition, data scramblers and block error correction coders may be included to provide security or to improve the bit error rate.

The output of the encoder is supplied to a multiplier 56 for modulating the encoded data on a data carrier. The encoded data is phase synchronized with a data carrier and is amplitude modulated by the multiplier 56. In this particular embodiment, the modulated carrier is either present or is not present depending upon whether the encoded data is a one or zero. Preferably, no carrier is transmitted during the blanking interval.

However, in other embodiments, different modulation schemes may be used. For low secondary data rate transmissions, the encoded data need not be synchronous with the modulated data and one data bit may be transmitted over several cycles of the data carrier. For higher data rates, where the encoded data is synchronous with the data carrier, more than two levels may be permissible for higher data rate transmission. For example, a half cycle may have a zero level peak, a ⅓ maximum level peak, a ⅔ maximum level peak and a maximum level peak so that two data bits may be transmitted in one half cycle. Other techniques may be used for increasing the data rate such as quadrature amplitude modulation, quadrature phase shift keying and phase modulation where the data and the data carrier are synchronized. Data rates of 280 kilobits per second have been found not to require such multibits per half cycle modulation techniques.

The modulated data carrier including the encoded data is passed through a low pass filter 58 that attenuates the higher sideband. The lower sideband of the data carrier is transmitted by the filter 58.

The output of the low pass filter 58 is supplied to a noninverting input of the adder 70 for combining the modulated, rasterized secondary data with the processed video. The timing of the data portion 50 and the video portion 20 is such that the blanking intervals in the video signal supplied to the adder 70 coincide with the inhibited intervals of the rasterized modulated data signal. The combined signal from the video portion 20 and the data portion 50 is a signal at the baseband frequency with the information for the data signals and the information for the video signals frequency interleaved into separate bands respectively with minimal overlap.

The interleaved signal may then be transmitted at normal data rates.

The timing section 30 comprises a vertical sync detector, a horizontal sync detector, a color frame detector and phase lock loops that use the detected signals for generating various timing signals. In particular, the data carrier is generated in this embodiment by dividing the horizontal scanning rate of the primary video signal by four and then multiplying the scanning rate by one thousand and forty three through the use of a phase lock loop to generate a data carrier at 4,102,708 hertz. Since the data signal has been rasterized and then modulated at a non-integral multiple of the horizontal frequency at the modulator 56, the spectral envelope of the video signal, when combined by the adder 70 to the video signal, is frequency interleaved with the video signal. Further, the data carrier should have a known phase relationship with the color frame.

Although a specific example has been selected for the data carrier, other non-integral multiples may be used. The criteria for the data carrier are that the data carrier: (1) should be a non-integral multiple of the horizontal scanning frequency, (2) should be preferably greater than the chrominance carrier, and (3) should be preferably outside the luminance band but be well enough within the video channel bandwidth so that there is not likely to be interference with aural channels.

In addition, the timing section uses phase lock loops to generate a system clock rasterizing signal 33 for outputting data from the elastic buffer 52. The system clock frequency should be either a submultiple or a multiple of the horizontal scanning frequency. The selection of the system clock frequency should be based upon the maximum data transmission rate during an active video line and the data clock rate. The clock should be inhibited for a period equal to each video and horizontal blanking interval so that no modulated data is combined with the video signal at the adder 70 during blanking intervals of the primary video signal; i.e. the blanking intervals in the output of the video 20 and data portion 50 should be synchronized. Further, the system clock rate should be sufficiently high so that the elastic buffer will not overflow.

The use of phase lock loops for generating both the system clock and the data carrier means that the two signals are phase related. This allows for transmission by a modulator at higher data rates by, for example, having each half cycle of the data carrier representing one data element for transmission.

A third output of the timing section is a pulse indicating the occurrence of the front porch of the horizontal sync pulse. This front porch pulse is provided by using any of several front porch pulse detector circuits (not shown) and is used by the DC restore circuit 24 to set the blanking level to be compatible with the RS 170A standard.

In higher data rate transmission systems, a video analyzer 40 may also be included. The video analyzer 40 includes a digital signal processor that analyzes the active portion of the video signal for information representing a group of pixels in a line representing a sharp transition. The video analyzer searches for signal information representing a sharp transition that would generate strong high frequency clusters of the luminance or chrominance signals. Then, an inhibit signal is sent to both the elastic buffer 52 and the encoder 54. The inhibit signal is time shifted so that no secondary data is supplied to the adder 70 when the primary video information representing the sharp transition is being outputted by the video portion 20. The use of the video analyzer 40 further reduces the possibility of interference between the secondary data and the primary video. The video analyzer may also insert start and stop codes into the data stream so that the receiver will recognize when data transmission has been inhibited to avoid interference.

The video analyzer 40 is only believed to be necessary in high data rate systems such as T1 and above. For lower data rate systems, the video analyzer 40 and the inhibit signal may be eliminated. In those systems that have the video analyzer, the delay line 26 in the primary video section 20 must delay the primary video signal sufficiently for the time period for processing of a group of pixels by the analyzer 40. If the data transmission rate is relatively low such as two hundred eighty kilobits per second, however, the video analyzer 40 and the delay line 26 may be eliminated.

The result at the output of the summer 70 is that the primary video signal and the data are frequency interleaved. In addition, the combined signal from the summer 70 still has the same type of blanking intervals found in the standard NTSC signal. Therefore, the video signal may be received by a standard NTSC receiver without detecting the secondary transmitted data.

To further ensure against interference, the output signal levels of the noise interference section 60 and the secondary data section 50 should be scaled. The scaling should set the injection level of those two sections to the adder 70 to avoid interference. The output level of the noise interference section 60, should be adjusted to minimize noise on the received data signal at a receiver. The output level of the data section 50 should be adjusted so that there is no noticeable interference on a video monitor coupled to the output of the adder 70.

In certain applications, it may be desirable to transmit an additional low frequency signal such as an audio signal. For example, an audio signal may be sampled using compression techniques such as in U.S. Pat. No. 5,021,786 and be transmitted during the horizontal sync intervals. If the secondary data is for example compressed video, the audio signal for both a right and a left audio channel for the compressed video may be sampled twice during each active interval and added during the horizontal sync pulses. A multiplexer controlled by the timing signal may be used for adding the compressed digital data during the horizontal sync pulses.

Figure 2:
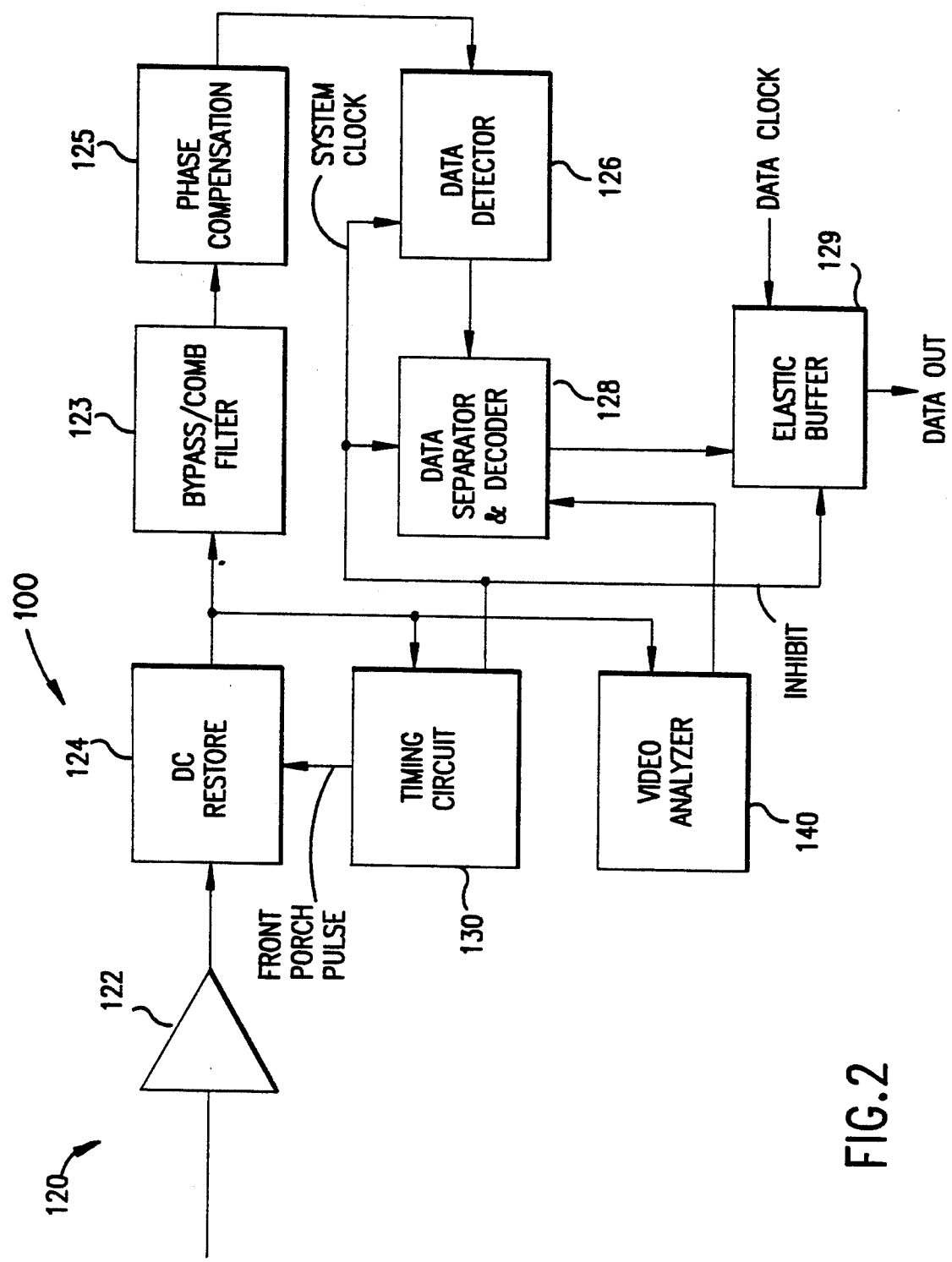
FIG. 2 is a block diagram for a signal processor incorporating an embodiment of the instant invention for use in a receiver.

FIG. 2 shows a signal processor 100 for a video receiver that separates the transmitted data from the signal transmitted by a video transmitter incorporating the processor 10 of FIG. 1. Again, although this embodiment is shown for receiving a primary NTSC signal having secondary digital data frequency interleaved with the video, other embodiments may use for other video signals and primary data.

In FIG. 2, the received baseband signal, containing both video and digital information is processed by two sections, a video section 120, a timing circuit 130 and a video analyzer section 140. The video section 120 processes the received baseband signal through an automatic gain control amplifier 122 and a DC restore circuit 124. The output of the DC restore circuit is supplied to a band pass/comb filter 123. The output of the band pass/comb filter 123 in the receiver 110 is to pass the interleaved frequencies containing the transmitted data signals but to block the primary video signal. The output of the band pass/comb filter 123 is supplied to a phase compensator 125 that adjusts for phase distortion due to the band pass/comb filter 123. The phase compensator 125 may be a second filter restoring phase linearity with frequency to adjust for the phase distortion introduced by the band pass/comb filter 123.

The phase compensated output signal is a reproduction of the rasterized and modulated data signal supplied to the adder 70 by the data portion 50. The rasterized modulated data signal is supplied to a data detector 126, which also receives a system clock signal. The data detector 126 comprises a peak detector that detects the peak signal in each period of the system clock and an envelope detector. For a data receiver compatible with a data transmitter of FIG. 1, the data detector output is preferably a digital signal that represents a one when a data carrier half cycle is present and a zero when a data carrier half cycle is not present. For lower data rates, the processor 100 may look for the presence of a data carrier over several cycles.

Although the above mentioned data detector 126 is designed for the transmitter 10, it should be understood that the data detector may be of any other format that has been chosen to be compatible with the data transmission or modulation format of the transmitter 10. For example, the data detector may be a phase detector if the data is phase modulated, or a quadrature amplitude detector if the transmitter uses quadrature amplitude modulation for the data. Further, if the data rate is sufficiently low where a bit of data is transmitted over several cycles, for example 64 kilobits per second, the data detector may be the aforementioned envelope detector.

At high data rates, a circuit for detecting synchronously modulated data may be needed. A clock recovery circuit may be used for recovering the clock from the data. That recovered clock may be used for sampling the modulated data. That sampled, modulated data may be provided to an analog to digital converter to produce a digital signal. Alternatively, a low pass filter, a rotator and a slicer may be used with the data detector.

The output of the data detector 126 is supplied to a data separator and decoder 128 that provides the digital data as an output. The data separator and decoder 128 receives from the timing circuit 130 a time adjusted composite blanking signal, and a regeneration of the data carrier outputted by the timing circuit 30. The data separator and decoder 128 also receives a video inhibit signal from a video analyzer 140. The data decoder 128 uses the data level bits for each clock period, the data carrier, the blanking composite signal and the inhibit signal to provide data at the same clock rate at the output as the data provided to the elastic buffer 52 of the transmitter. The data decoder and separator 128 will also remove the encoding provided by the encoder 54 in the transmitter 10.

The output of the separator 128 is provided to an first in first out elastic buffer 129. The rate at which data is inputted to the buffer 129 is controlled by the system clock from the timing block 130. The data may be outputted from the buffer by a second clock (not shown) at any desired data rate that prevents the buffer from overflowing.

The video analyzer 140 and the timing block 130 operate in the manner of the timing section 30 and the video analyzer 40 in the transmitter 10. The analyzer 140 and the timing block 130 prevent the data decoder and separator 128 from reading blanking intervals in the rasterized data or inhibit periods transmitted in the data. So that the data signal will be properly recovered a delay line (not shown) should be included before the data detector, where the delay line compensates for the processing period of the video analyzer 140.

It should be noted however, that if the video analyzer 40 of FIG. 1 inserts start/stop codes in the data stream when data transmission is inhibited due to interference considerations, the receiver does not need a video analyzer 140. Instead, the data detector and separator 128 may detect these start/stop codes as part of the decoding function.

Although the foregoing embodiment is designed for a primary video signal that is in the NTSC format and transmitting secondary digital data for frequency interleaving, other embodiments of the instant invention may be used. The primary video signal for transmission may be for example a signal in the PAL or the SECAM format, any rasterized HDTV signal, or any other signal that has been rasterized. Further, the data may be analog or digital data and the transmission and reception formats may be synchronous or non-synchronous depending upon the secondary data rate. A particular useful application for the disclosed invention is to transmit a compressed video signal, ACTV signal or HDTV signal as the secondary data signal.

By using the disclosed signal processors, the received video signal may be demodulated and recovered by an ordinary video receiver without the transmitted data causing noticeable interference on the television picture generated by the receiver. The transmitted, secondary data may also be readily separated. It should be understood that the secondary data provided to the signal processor may differ from the primary video signal in a number of different aspects. Before being rasterized, the secondary data signal has a low cross-correlation with the video signal as the two signals may be completely unrelated. Therefore, a wide variety of data may be transmitted and is particularly useful in systems where one way communications is preferred.

We claim:

1. A method for transmitting data in the same communications channel as a video signal being transmitted in a given frequency band, the video signal having a video bandwidth with an upper frequency limit and active and blanking intervals with a sync frequency, and the video signal and the data being uncorrelated with respect to each other, the method comprising:
   detecting the active video intervals; and
   transmitting the data at frequencies within the band and primarily near the upper frequency limit of the band substantially centered around quarter non-integral multiples of the sync frequency during at least some of the active video intervals.

2. The method of claim 1, wherein the method for detecting the active video intervals comprises detecting the blanking intervals of the video signal.

3. The method of claim 2, wherein the intervals are defined by sync pulses, and wherein the video spectrum envelope has gaps and transmitting the data comprises:
   generating a data carrier at a frequency that is a quarter non-integral multiple of the sync frequency for modulating the data based upon at least some of the intervals between sync pulses; and
   modulating the data carrier with a data signal corresponding to the secondary data whereby the modulated data carrier falls within the gaps of the video signal when modulated by the data carrier, whereby frequency interleaving is obtained.

4. The method of claim 2, wherein the step of transmitting the data further includes blanking the data signal other than during the active video period whereby the data signal is rasterized.

5. A system for combining a data signal with a color frequency interleaved video signal having a color carrier, audio information in a frequency band above frequency bands of luminance and chrominance information, horizontal sync pulses at a predetermined rate and gaps in the video frequency bands with the spectral energy of the luminance and chrominance information separated by about half the rate of the horizontal sync pulses, the system comprising:
  a timing circuit responsive to the sync pulses, the timing circuit producing a data carrier at a frequency that is a non-integral multiple of the rate and a timing signal indicating the time periods of the blanking interval;
  a combiner having at least two inputs;
  a video portion providing the video signal to one input of the combiner;
  a data portion providing a second input to the combiner; and
  the data portion including:
    a data buffer receiving the data and providing rasterized data at an output based upon the blanking signal and the secondary data;
    a modulator for providing a modulated data signal responsive to the data carrier and the output of the data buffer, the modulated data signal being coupled to the second input of the combiner such that the spectra of the modulated data signal lies substantially within the gaps of the video spectra and is primarily above the color carrier.

6. The system of claim 5, the data portion further including a scrambler coupling the rasterized data to the modulator, wherein the rasterized data received by the modulator is scrambled.

7. The system of claim 5, wherein the data signal includes a clock that controls the rate at which data is stored in the buffer.

8. The signal processor of claim 5, wherein the signal processor section further includes an encoder for limiting the bandwidth of the rasterized data.

9. The signal processor of claim 5, wherein the video signal is an NTSC signal.

10. The signal processor of claim 5, wherein the secondary data signal is a compressed video signal.

11. The signal processor of claim 5, wherein the buffer is an elastic buffer.

12. The signal processor of claim 5, wherein the signal processor further includes a filter receiving the video signal and producing as an output a signal that attenuates a reduced portion of the spectra of the video signal containing the video information.

13. The signal processor of claim 5, wherein the signal processor further includes means for detecting at least one of luminance and chrominance transitions in the video signal above a predetermined limit and for inhibiting data transmission such that no modulated data is provided to the combiner while the portion of the primary video signal containing those transitions reaches the combiner.

14. The signal processor of claim 5, wherein the signal processor further includes means for detecting at least one of luminance and chrominance transitions in the video signal above a predetermined limit and for inserting a unique code in the modulated data to inform a receiver that transmission of secondary data will be halted temporarily.

15. A signal processor for separating a data signal from a rasterized video signal having horizontal and vertical blanking intervals at predetermined intervals and frequencies and having chrominance and luminance information frequency interleaved through use of a color carrier having a frequency in a bandwidth and clustered at a frequencies separated from each other by about half the horizontal frequency and the data information being contained substantially in at least one unused portion of the same bandwidth, the processor comprising:
  a timing circuit generating a timing signal at a predetermined frequency based upon the rate of the horizontal intervals;
  a band pass filter having a lower cutoff frequency of about the frequency of the color carrier and passing as an output the frequencies for the data signal; and
  a data separator responsive to the timing signal and the output of the filter for outputting the data signal at a data rate above about 100 kilobits per second.

16. The signal processor of claim 15, wherein transmission of the data signal has been inhibited during intervals when the video signal represents relatively sharp transitions between pixels and the processor comprises a video processor for detecting information in the signal representing sharp transitions, and the separator further includes a data synchronizer responsive to the video processor.

17. The processor of claim 16, wherein the timing circuit outputs a pulse representing the blanking intervals and the separator uses the pulse to recognize the blanking intervals in the transmitted data signal.

18. The processor of claim 15, further including a phase compensator for compensating the data signal for any phase distortion of the filter, and the data separator further includes a synchronous data detector for detecting data in the phase compensated data signal.

19. A system for adding a secondary data signal to a primary color video signal of a format according to a predetermined standard having blanking intervals defined by sync pulses and a frequency band, the frequency band of the primary video signal including both chrominance and luminance energy frequency interleaved with each other by modulation with a chrominance subcarrier, the chrominance energy lying within the upper portion of the video band, the data signal being uncorrelated to the video signal, the system comprising:
  means for detecting at least some of the sync pulses in the video signal;
  means for modulating a data carrier having a frequency above the chrominance carrier but substantially within the band of the primary video signal with the data to provide a modulated data signal having a frequency band near the modulated data carrier and at least partially overlapping the video band of the video signal between the data and chrominance carriers; and
  means for combining the modulated data signal with the video signal such that the data signal is transparent to a receiver designed to receive the video signal.

20. The system of claim 19, wherein the data signal synchronously modulates a data carrier.

21. A process for removing data information combined with color video information in a combined, rasterized signal generated by a chrominance subcarrier positioned in the upper portion of the video bandwidth and having a blanking interval, and a bandwidth of greater than 3.5 megahertz, the processor comprising:
  means for receiving the combined signal;
  means for generating a data subcarrier based upon the frequency of at least the blanking interval at a frequency above the frequency of the chrominance subcarrier but within the bandwidth;
  means responsive to the detecting means for demodulating the data with the data subcarrier; and
  means for derasterizing the data.

22. The processor of claim 21 further including a means for attenuating the spectral energy of the combined signal below the chrominance subcarrier before demodulating.

23. A method for transmitting a data signal with a rasterized color video signal of a standard format having a luminance subcarrier, a chrominance subcarrier, the chrominance subcarrier being at an odd half multiple of a rasterization frequency in the upper half of the spectra of the video signal, and a bandwidth, the luminance information and the chrominance information in the video signal being frequency interleaved, the method comprising:
  rasterizing the data signal;
  generating a data subcarrier at a frequency above the chrominance subcarrier to generate a modulated data signal having a spectra;
  modulating the rasterized data signal with the data subcarrier, whereby the spectra of the modulated rasterized data signal lies at least in part between the chrominance and data subcarriers; and
  combining the modulated rasterized data signal with the video signal.

24. The method of claim 23, the method further comprising attenuating the spectral energy of the video signal above the chrominance subcarrier frequency before combining the signals.

25. A processor for transmitting a data signal component with a rasterized color video signal component having active video intervals separated by video blanking intervals, the bandwidth of the video signal being greater than 3.0 megahertz and the color information being frequency interleaved in the upper portion of the bandwidth of the video signal by a color carrier located within the frequency band, the processor comprising:
  means for generating a first rasterized data signal component having a data rate of at least about 100 kilobits per second so that the data signal has data blanking intervals separating active data intervals; and
  means for combining the rasterized data signal component with the video signal component within the portion of the bandwidth between the color carrier of the video signal and the upper end of the bandwidth such that at least some of the video blanking intervals in the data signal substantially coincide with the active video blanking intervals and substantially without interference between the components of the combined signal.

26. The processor of claim 25, the processor further comprising:
  a means for attenuating the spectral energy of the video signal at least some frequencies above 3.0 Megahertz before combining the video and the data signals.

27. The processor of claim 25, the processor comprising:
  means for modulating the rasterized data signal with a data subcarrier above 3.0 megahertz and providing the modulated rasterized data signal to be combined with the video signal.

28. The processor of claim 27, the processor comprising:
  means for generating the data subcarrier at a quarter non-integral multiple of the video signal for modulating the rasterized data signal.

29. A processor for extracting data information having data blanking intervals coinciding with at least part of a blanking interval of a video signal, the data information having been modulated with a subcarrier at a quarter non-integral multiple of the blanking interval frequency, the video signal including a luminance information a chrominance information that has been modulated by a chrominance subcarrier above 3.0 megahertz, wherein the video signal has scanning frequency, the processor comprising:
  means for generating a demodulation subcarrier at about quarter non-integral submultiple of the scanning frequency above the chrominance subcarrier;
  means for attenuating a least a portion of the portion of the video signal below the chrominance subcarrier;
  means for demodulating the data information from the attenuated video signal with the demodulating subcarrier; and
  means for eliminating the blanking intervals in the data signal.

30. A process for extracting data information intermixed with video information in a rasterized video signal having blanking intervals according to one of a predetermined format, the video information including luminance information modulated with a luminance subcarrier, chrominance information modulated with a chrominance subcarrier, the spectral energy of the data information being contained primarily in the frequencies above the chrominance subcarrier, the process comprising:
  generating a subcarrier at a frequency above the chrominance subcarrier from the video signal;
  extracting the data information by demodulating the video signal with the generated subcarrier; and
  removing the blanking intervals from the extracted data information.

31. A method for transmitting a data signal having a data rate of greater than about 100 kilobits per second with a frequency interleaved, rasterized color video signal having blanking intervals, a bandwidth and unused portion of spectra within that bandwidth, and the color information having been modulated by a color carrier in the upper half of the video bandwidth, the method comprising:
  rasterizing the data signal to have blanking intervals and active data intervals at a frequency greater than 100 kilobits per second;
  generating a data carrier based upon the rasterized video signal having blanking intervals at the upper edge of the bandwidth;
  modulating the data subcarrier with the rasterized data signal such that the modulated, rasterized data signal lies substantially within at least one of the unused portions of the spectra; and combining the modulated, rasterized data signal with the video signal.

32. The method of claim 31, chrominance information in the video signal having been modulated by a subcarrier, the method further comprising generating the subcarrier at a frequency substantially a quarter non-integral multiple of some of the blanking intervals and the frequency being above the frequency of the chrominance subcarrier.

33. A method for transmitting a data signal within the bandwidth of a part of a color video signal at baseband, the video signal being one of a group comprised of NTSC, PAL and SECAM format with a color signal interleaved with a luminance signal by modulating the color information with a carrier at an odd multiple of a half horizontal line frequency, the method comprising:

filtering at least part of the video signal above the video signal containing the color information;

rasterizing the data signal;

modulating the data signal with a carrier above the frequency of the color signal and within the baseband bandwidth of the video signal; and injecting the modulating data signal into the video signal.

34. The method of claim 33, further comprising:

generating the carrier at a quarter, odd multiple of the horizontal line frequency.

35. The method of claim 33, comprising:

generating the carrier at about the upper end of the video bandwidth.

36. An apparatus for injecting a data signal having a data rate into a frequency interleaved, rasterized, color video signal having blanking intervals at a frequency, a bandwidth with an upper limit, a color carrier, the method comprising:

a rasterizer responsive to the data signal to provide a rasterized data signal have blanking intervals separating active data intervals;

a data carrier generator generating a data carrier at a frequency near the upper limit of the video bandwidth;

a modulator responsive to the data carrier and the rasterized data signal to produce a modulated, rasterized data signal; and a combiner responsive to inject the modulated, rasterized data signal into the video signal at an injection level and such that the blanking intervals in the two signals substantially coincide.

37. The apparatus of claim 36, wherein the data carrier is at a frequency that is at about a one quarter non-integral of the blanking interval frequency.

38. The apparatus of claim 36, wherein the injection level is such that the video signal is not perceptible to a viewer at a television receiver receiving the combined signals.

39. The apparatus of claim 36, wherein the portion of the bandwidth of the video signal where the data signal is injected is filtered.

* * * * *